(12) United States Patent
Zu (10) Patent No.: US 11,836,478 B2
(45) Date of Patent: Dec. 5, 2023

(54) VIRTUAL NETWORK FUNCTION AND PHYSICAL NETWORK FUNCTION SOFTWARE UPGRADE

(71) Applicant: TELEFONAKTIEBOLAGET LM ERICSSON (PUBL), Stockholm (SE)

(72) Inventor: Qiang Zu, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 205 days.

(21) Appl. No.: 17/609,873

(22) PCT Filed: May 29, 2020

(86) PCT No.: PCT/IB2020/055140
§ 371 (c)(1),
(2) Date: Nov. 9, 2021

(87) PCT Pub. No.: WO2020/250077
PCT Pub. Date: Dec. 17, 2020

(65) Prior Publication Data
US 2022/0214870 A1   Jul. 7, 2022

Related U.S. Application Data

(60) Provisional application No. 62/859,856, filed on Jun. 11, 2019.

(51) Int. Cl.
*H04L 12/24* (2006.01)
*G06F 9/445* (2018.01)
(Continued)

(52) U.S. Cl.
CPC ............ *G06F 8/65* (2013.01); *G06F 9/45558* (2013.01); *H04L 41/0893* (2013.01); *H04L 41/20* (2013.01); *G06F 2009/45595* (2013.01)

(58) Field of Classification Search
CPC ............ H04L 41/0846; H04L 41/0894; H04L 41/082; H04L 41/20; H04L 41/40;
(Continued)

(56) References Cited

U.S. PATENT DOCUMENTS 10,880,173 B2 * 12/2020 Seenappa ............ H04L 41/5058

FOREIGN PATENT DOCUMENTS

| EP | 3094049 | 11/2016 |
|---|---|---|
| WO | 2018072503 | 4/2018 |

OTHER PUBLICATIONS

Rodriguez et al., Automating the deployment of 5G Network Slices using ONAP, 8 pages (Year: 2019).*

(Continued)

*Primary Examiner* — Thuy Dao
(74) *Attorney, Agent, or Firm* — Julie Dufort; Ericsson Canada Inc.

(57) ABSTRACT

The disclosure relates to a method and system for upgrading a service instance of a VNF or PNF executing in ONAP. The method comprises when onboarding an updated VNF or PNF package, creating a new network resource associated with the VNF or PNF package. Adding an upgrade path artifact to the new network resource including information about which existing network resources can be upgraded to the new network resource. Updating a service template associated with the VNF or PNF package by replacing an existing network resource with the new network resource and by generating an upgrade artifact including an upgrade option which indicates from which version a service template can be upgraded. Upgrading a corresponding VNF or PNF service instance by executing an upgrade workflow using the upgrade artifact of the upgraded service template associated with the VNF or PNF service instance.

8 Claims, 11 Drawing Sheets

(51) Int. Cl.
  *H04L 12/26*    (2006.01)
  *G06F 9/455*    (2018.01)
  *G06F 8/65*     (2018.01)
  *H04L 41/0893*  (2022.01)
  *H04L 41/00*    (2022.01)

(58) Field of Classification Search
  CPC ... H04L 41/0895; H04L 41/0893; G06F 8/65;
              G06F 9/45558; G06F 2009/45595
  See application file for complete search history.

(56) References Cited

OTHER PUBLICATIONS

A. Mahimkar, "Change Management Extensions", Confluence, Aug. 22, 2019.
ETSI, "Network Functions Virtualization (NFV); Management; and Orchestration", GS NFV-MAN 001, V1.1.1, pp. 1-184., Dec. 2014.
R. Krishnan, "Edge Automation through ONAP", Confluence, https://wiki.onap.org/display/DW/Edge+Automation+through+ONAP, Dec. 13, 2019.
S. Sundaramunthy, "5G Use case Items", Confluence, https://wiki.onap.org/display/DW/5G+Use+case+Items, Aug. 30, 2018.
Y. Kluger, "Use case proposal: 5G-RAN deployment, Slicing, SON", Confluence, Mar. 23, 2018.
Y. Wang, "5G—PNF Software Update", Confluence, May 17, 2019.

* cited by examiner

VIRTUAL NETWORK FUNCTION AND PHYSICAL NETWORK FUNCTION SOFTWARE UPGRADE

PRIORITY STATEMENT UNDER 35 U.S.C. S.119(e) & 37 C.F.R. S.1.78

This non-provisional patent application claims priority based upon the prior U.S. provisional patent application entitled "VIRTUAL NETWORK FUNCTION (VNF) AND PHYSICAL NETWORK FUNCTION (PNF) SOFTWARE UPGRADE", application No. 62/859,856, filed Jun. 11, 2019, in the name of QIANG.

TECHNICAL FIELD

The present disclosure relates to network service upgrade and more particularly to VNF and PNF software upgrade.

BACKGROUND

Open Network Automation Platform (ONAP) provides a comprehensive platform for real-time, policy-driven orchestration and automation of physical and virtual network functions that will enable software, network, information technology (IT), cloud providers and developers to rapidly automate new services and support complete lifecycle management. By unifying member resources, ONAP will accelerate the development of a vibrant ecosystem around a globally shared architecture and implementation for network automation—with an open standard focus—faster than any one product could on its own.

New Fifth Generation (5G) use cases require ONAP to support PNF and VNF onboarding and upgrade.

A few solutions have been discussed, including https://wiki.onap.org/display/DW/5G+-+PNF+Software+Update and https://wiki.onap.org/display/DW/Change+Management+Extensions

SUMMARY

One problem is that the current ONAP software upgrade procedure does not support service level life cycle management (LCM) operations, such as upgrade, and it has difficulty supporting service level schema update as well.

The present disclosure concerns a solution which allows VNF and PNF software upgrade and schema update with service level operation. The proposed solution allows upgrading a selected network service using ONAP architecture with a designed upgrade option.

There is provided a method for upgrading a service instance of a virtual network function (VNF) or physical network function (PNF) executing in the Open Network Automation Platform (ONAP). The method comprises when onboarding an updated VNF package or PNF package, creating a new network resource associated with the VNF or PNF package. The method comprises adding an upgrade path artifact to the new network resource, the upgrade path artifact including information about which existing network resources can be upgraded to the new network resource. The method comprises updating a service template associated with the VNF or PNF package by replacing an existing network resource of the service template with the new network resource and by generating an upgrade artifact including at least one upgrade option which indicates from which at least one version a service template can be upgraded. The method comprises upgrading a corresponding VNF or PNF service instance by executing an upgrade workflow using the upgrade artifact of the upgraded service template associated with the VNF or PNF service instance.

There is provided a system for upgrading a service instance of a virtual network function (VNF) or physical network function (PNF) executing in the Open Network Automation Platform (ONAP) comprising processing circuits and a memory. The memory contains instructions executable by the processing circuits whereby the system is operative to: when onboarding an updated VNF package or PNF package, create a new network resource associated with the VNF or PNF package. The system is operative to add an upgrade path artifact to the new network resource, the upgrade path artifact including information about which existing network resources can be upgraded to the new network resource. The system is operative to update a service template associated with the VNF or PNF package by replacing an existing network resource of the service template with the new network resource and by generating an upgrade artifact including at least one upgrade option which indicates from which at least one version a service template can be upgraded. The system is operative to upgrade a corresponding VNF or PNF service instance by executing an upgrade workflow using the upgrade artifact of the upgraded service template associated with the VNF or PNF service instance.

There is provided a non-transitory computer readable media having stored thereon instructions for upgrading a service instance of a virtual network function (VNF) or physical network function (PNF) executing in the Open Network Automation Platform (ONAP). The instructions comprise when onboarding an updated VNF package or PNF package, creating a new network resource associated with the VNF or PNF package. The instructions comprise adding an upgrade path artifact to the new network resource, the upgrade path artifact including information about which existing network resources can be upgraded to the new network resource. The instructions comprise updating a service template associated with the VNF or PNF package by replacing an existing network resource of the service template with the new network resource and by generating an upgrade artifact including at least one upgrade option which indicates from which at least one version a service template can be upgraded. The instructions comprise upgrading a corresponding VNF or PNF service instance by executing an upgrade workflow using the upgrade artifact of the upgraded service template associated with the VNF or PNF service instance.

The method(s) provided herein present improvement(s) to the way ONAP operates.

DETAILED DESCRIPTION

Various features will now be described with reference to the figures to fully convey the scope of the disclosure to those skilled in the art.

Many aspects will be described in terms of sequences of actions or functions. It should be recognized that according to some aspects, some functions or actions could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed.

In this disclosure, "upgrade path info", "upgrade options" and "upgrade artifact" may be used interchangeably. There are two level of information: resource upgrade path and service upgrade option. Both are needed to support service level life cycle management (LCM) operations. The resource upgrade path indicates how a resource can be upgraded, including from which version. The service upgrade option indicates which of the resource within the template can be upgraded.

"Upgrade path info" may also be used interchangeably with service "LCM info". LCM info is what contains the "upgrade artifact". "Upgrade artifact" may be used interchangeably with "LCM metadata". "Upgrade artifact" is stored in the resource template. The "upgrade options" also contains the upgrade path info at service level which is stored in the service template. Both "upgrade artifact" and "upgrade options" may be stored in multiple ways such as metadata data, artifact files, etc. The final name of these info, artifacts, options, etc. may differ in the releases of ONAP.

Figure 1:
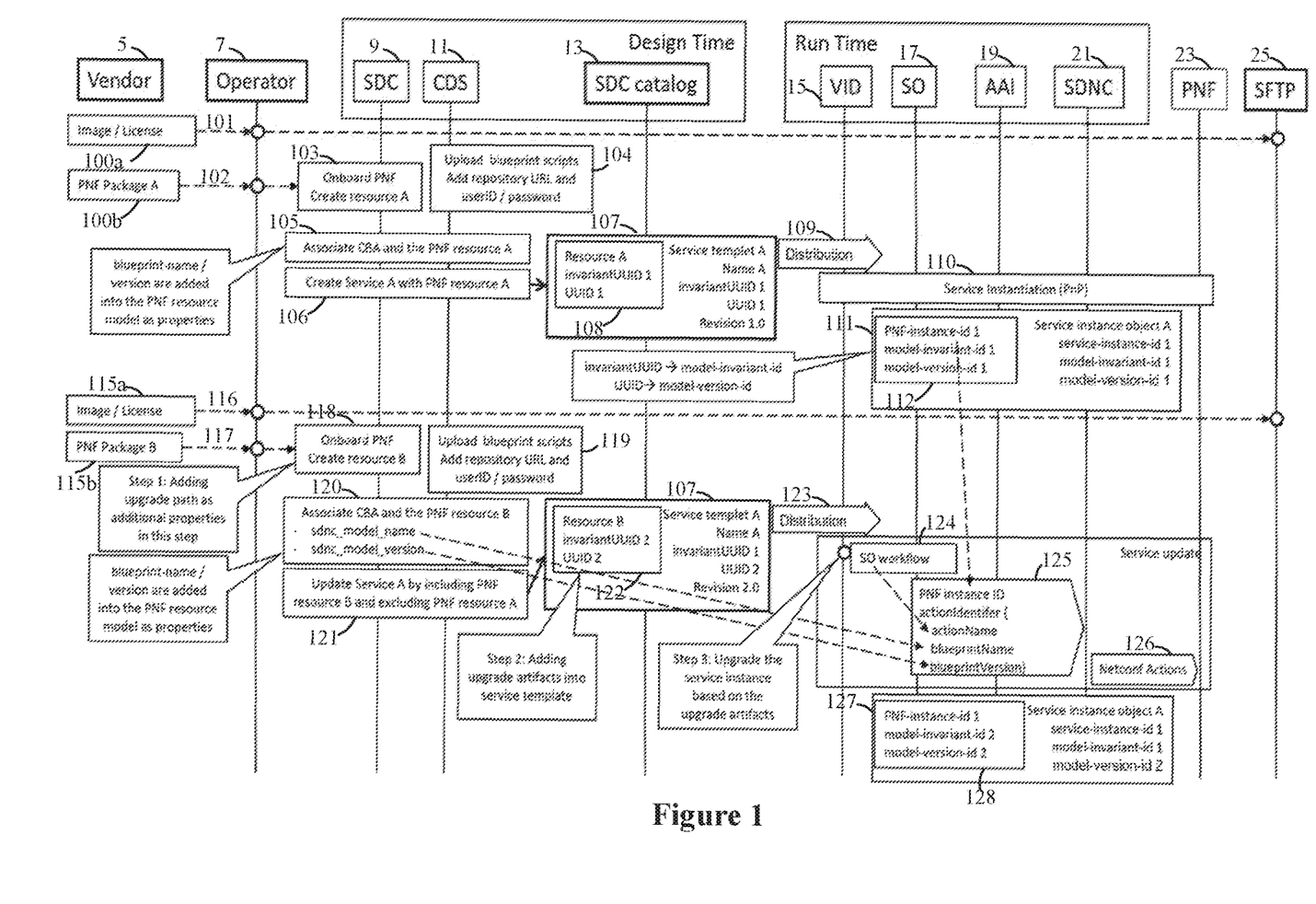
FIG. 1 is a schematic illustration of an example of the service level operation for a PNF software upgrade and schema update procedure.

FIG. 1 shows the upgrade procedure in the context of ONAP. There are new steps in this procedure which will be described in more details, after describing how a first PNF package is deployed.

A vendor 5 provides a software image and a license 100a to an operator 7 at step 101, which is in turn provided it to a PNF-secure shell (SSH) file transferring protocol (SFTP) 25, from which it will be possible to retrieve the software image at run time. A PNF package A 100b is then provided from the vendor 5 to the operator 7, at step 102.

The design time phase starts with the operator 7 providing the PNF package to the service design and creation (SDC) 9, which onboards the PNF and creates a resource (resource A) associated with the PNF package A, step 103. A controller design studio (CDS) 11 uploads blueprint scripts and adds a repository Uniform Resource Locator (URL) as well as user identifier (ID)/password to the onboarded PNF, step 104.

The SDC 9 and CDS 11 then associate the CDS blueprint achieved (CBA) and the PNF resource A, i.e. a blueprint-name and version are added into the PNF resource A model as properties, step 105. The SDC 9 and CDS 11 then create a service A with PNF resource A at step 106. As a result of step 106, the service template A, 107, is created which contains resource A 108 as well as the service template name and the version or revision, in this case revision 1.0. The service template A 107 is stored in an SDC catalog 13.

The run time phase starts after the service template A is distributed, step 109, to the Virtual Infrastructure Deployment (VID) 15 or Command Line Interface (CLI) and the service orchestration (SO) 17. At this point, there is instantiation of service A, including PNF plug and play (PnP), step 110, and a service instance object A 111 is created. Service instance object A 111 defines that it uses model-version-id 1 and includes an invariant universally unique identifier (UUID) as well as a model version UUID as illustrated in the PNF instance object 112.

The upgrade procedure starts after the vendor 5 provides a new software image and a license 115a to the operator 7 at step 116, which is in turn provided it to the SFTP 25, from which it will be possible to retrieve the software image at run time. A PNF package B 115b is then provided from the vendor 5 to the operator 7, at step 117.

The design time phase starts for the new PNF package B 115b with the operator 7 providing the PNF package to the SDC 9, which onboards the PNF, step 118.

When onboarding the updated PNF or a VNF package, in step 1, a new network resource, resource B, is created. At the creation, an upgrade path artifact is added into the resource package (resource B). The upgrade path artifact includes the information concerning which existing network resource models can be upgraded to this new resource model. In the example of FIG. 1, resource A will be upgraded to resource B and the upgrade path artifact is going to provide addition information at service design time.

The CDS 11 then uploads blueprint scripts and adds a repository URL as well as user ID/password to the newly onboarded PNF, step 119.

The SDC 9 and CDS 11 associate the CBA and the PNF resource B, i.e. a blueprint-name sdnc_model_name and version sdnc_model_version are added into the PNF resource B model as properties, step 120. These properties will be used at runtime by the upgrade workflow.

The SDC 9 and CDS 11 then update the service A by including PNF resource B and excluding PNF resource A, at step 121. As a result of step 121, the service template A, 107, is updated and contains resource B 108 as well as the service template name and the version or revision, in this case revision 1.0. The service template A 107 is stored in an SDC catalog 13.

In step 2, at the service design time, in this example, Service template A is being updated from revision 1.0 to revision 2.0, and, the resource A is replaced by resource B. When updating the service template, the operator uses the resource upgrade path artifacts as a reference and generates an upgrade artifact that will be stored in the service template. The upgrade artifact stored in the service template contains the upgrade options which indicates how the service template can be upgraded and from which version of the service template it can be upgraded to the current revision. This upgrade option will be used at run time to upgrade a service instance. It is contemplated that, in certain instances, to upgrade a service template to a given revision, it may first need to be upgraded to an intermediate revision. For example, a service template could need to be upgraded from version 2.0 to 3.0 by upgrading from version 2.0 to 2.5 and then from version 2.5 to 3.0.

The run time phase starts after the updated service template A is distributed, step 123, to the VID 15 or CLI and SO 17. In the step 3, the SO workflow is executed that will upgrade the service instance based on the upgrade artifacts that were included in Resource B 122. When a target service instance is selected, the operator also selects an allowed upgrade option based on the upgrade artifact in the service template. Once the upgrade option is selected, the service orchestration 17 executes the designed upgrade workflow 124 and updates the service.

The SO workflow 124 generates the CDS self-service AIP request 125 which contains the PNF instance ID, and includes the blueprint name and version generated at step 120. Using this, the controller/blueprint processor, the software defined network controller (SDNC) 21, executes blueprint scripts including sending Netconf request(s), step 126, to the VNF/PNF 23 instance. The software image can be retrieved from the SFTP 25 at this point. The SO 17 also updates the active and available inventory (AAI) 19 with the active software-version when the upgrade is completed (step not illustrated).

At this point, the instance of service A is updated to version (or revision) 2. Service instance object A 127 defines that it uses model-version-id 2 and UUIDs as illustrated in the PNF instance object 128, indicating that the service instance is model version 2 of service (PNF) instance 1.

Current Development Status

In ONAP, VNF software upgrade is supported using Ansible and Chef, with life cycle management application programming interface (LCM API) and is done with "generic" service orchestration building blocks.

PNF software upgrade is supported in Casablanca and updated in Dublin, with the support of an external management (EM), using ansible protocol only. There is a plan to use LCM API with existing service orchestration building blocks. The impacts are on software defined network controller (SDNC) only (not an end to end (E2E) solution yet).

There are three targeted use cases.

Use case 1: Using ONAP for service design and instantiation. Using ONAP to manage VNF/PNF functions, e.g. data collection/event handling. Using ONAP for VNF/PNF LCM operations.

For this use case, a solution is required to support VNF/PNF software upgrade and PNF schema update, with the consideration of service level impacts.

Use case 2: Using ONAP for service design and instantiation. Using ONAP to manage some VNF/PNF functions, e.g. data collection/event handling. Using external management system for VNF/PNF LCM operations.

For this use case, a solution is required to support VNF/PNF schema update, with the consideration of service level impacts.

Use case 3: Using ONAP for PNF software upgrade only, e.g. software corrections. ONAP is not used to manage any new functions supported by the new software version. For this use case, a solution is required to support PNF software update without impacts on PNF schema and service template.

Figure 2:
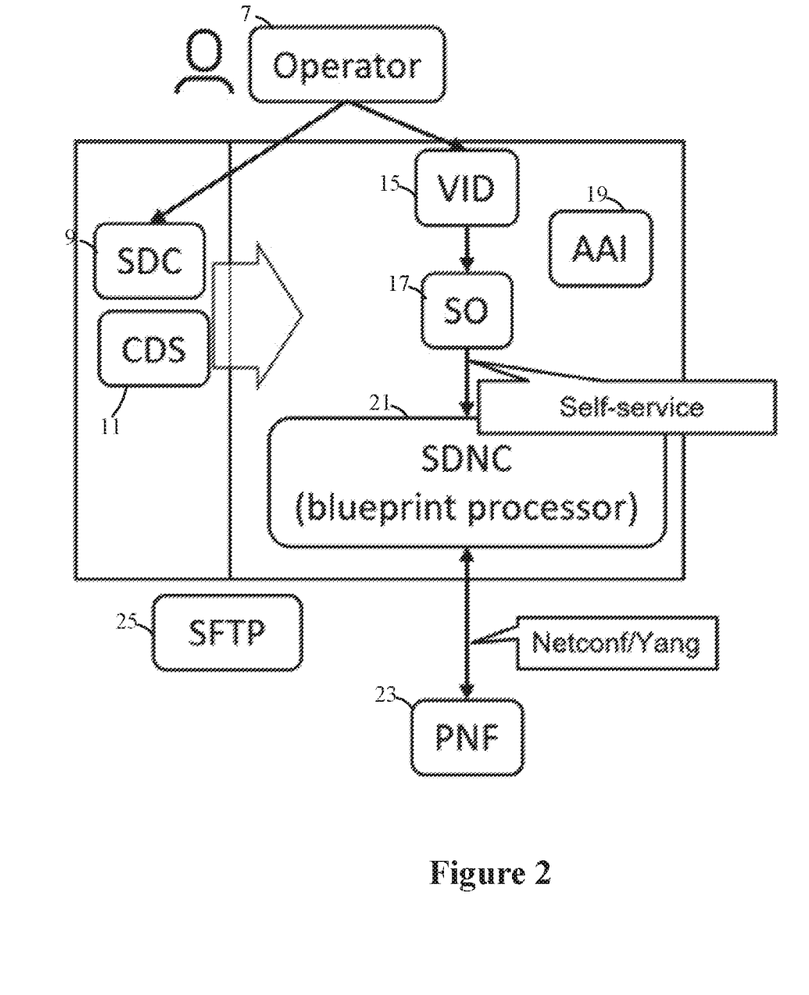
FIG. 2 is a schematic illustration of the high-level description of the PNF Software (SW) upgrade.
Figure 3:
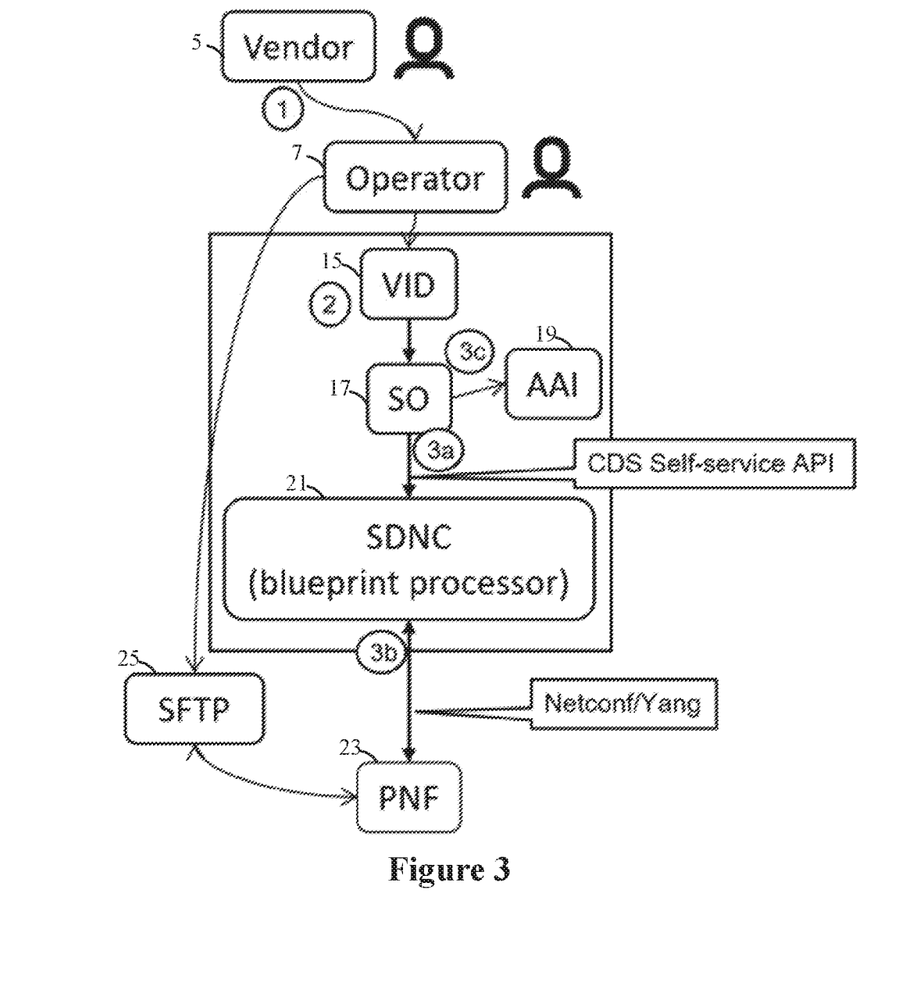
FIG. 3 is another schematic illustration of the high-level description of the PNF SW upgrade.

Reference is now made to FIGS. 2 and 3 which illustrate preconditions and a proposed PNF SW Upgrade for use case 3.

PNF software upgrade is one aspect of Software Management. The purpose of this procedure is to upgrade the software currently running on the PNF to a target software version without impacting the PNF schema and service template.

The solution to use case 3 proposes enhancement and additions of PNF in-place software update. It supports direct PNF NETCONF interface with the vendor-specific YANG model. It enhances service orchestration in-place software upgrade workflow with generic service orchestration building blocks, which can be used for workflow design in the design time. It allows using controller design studio self-service API between service orchestration and controller with the support of PNF in-place software upgrade. It enhances Virtual Infrastructure Deployment to demonstrate single PNF in-place software upgrade. It enhances service orchestration procedure to support active and available inventory update after the software upgrade completion.

Referring to FIG. 2, as pre-conditions, ONAP should be ready to use. Service orchestration upgrade workflows should be ready to use. A service design and creation service template with one PNF resource is designed (including CDS blueprint achieved (CBA) association) and is distributed at run time. Service instantiation is completed, including PNF plug and play. A PNF instance is up and running with connectivity between PNF-ONAP, PNF-secure shell file transferring protocol (SFTP).

Reference is now made to FIG. 3 which illustrates the upgrade of one PNF instance. In step 1, a vendor 5 delivers the new software image to the operator 7 and the software image is stored in the SFTP server 25. In step 2, at the VID 15, the operator 7: selects a workflow, and a PNF instance; provides the target software version; and initiate the upgrade procedure. In step 3, the SO 17 executes the workflow: in step 3a, the service orchestration sends CDS request(s) with action-identifier {actionName, blueprintName, blueprintVersion} to the blueprint processor inside the controller (SDNC) 21 using CDS self-service API. In step 3b, the Controller/blueprint processor executes the blueprint scripts including sending Netconf request(s) to the VNF/PNF instance 23. In step 3c, the SO 17 updates the active and available inventory, AAI 19, with the active software-version when the upgrade is completed.

Figure 4:
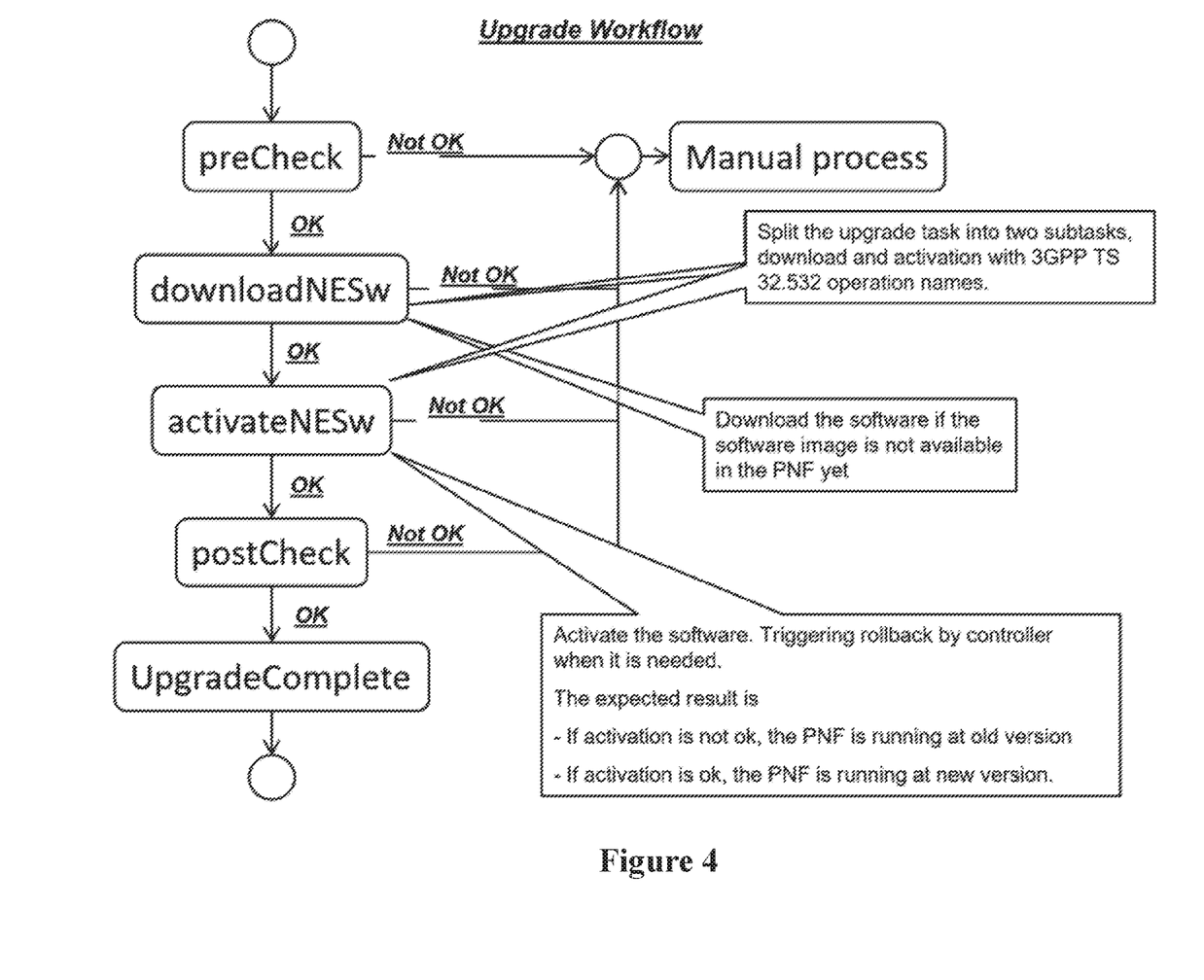
FIG. 4 is a schematic illustration of an example service orchestration (SO) workflow for software upgrade.
Figure 5:
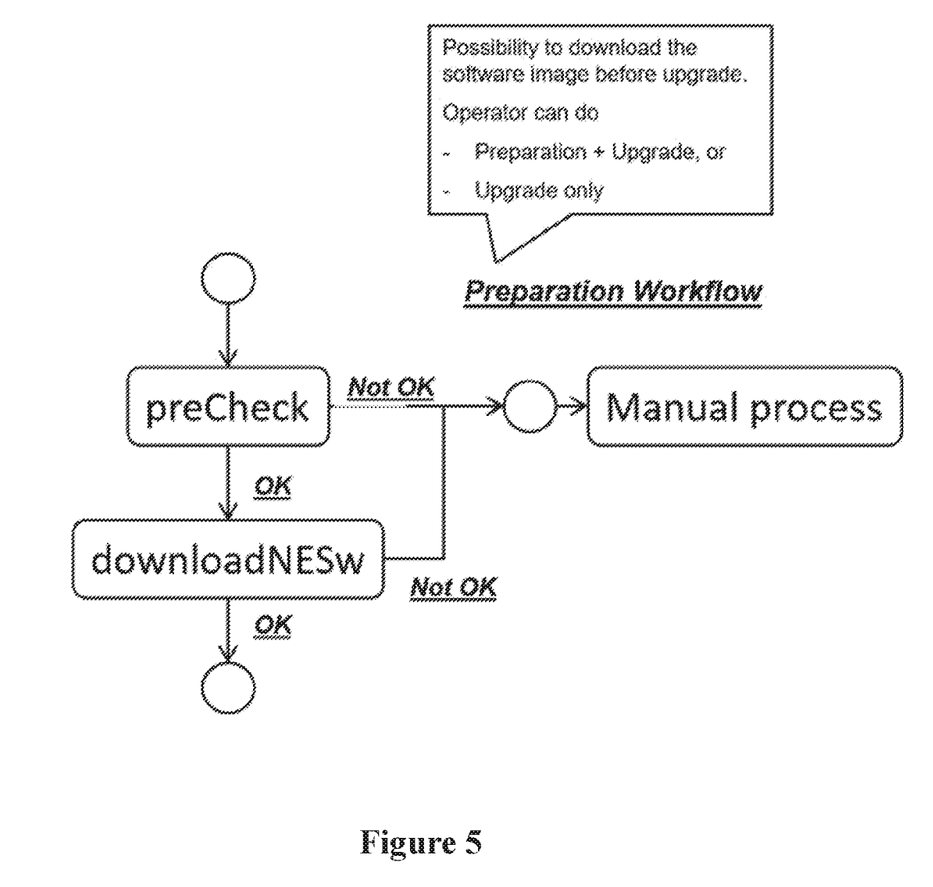
FIG. 5 is a schematic illustration of an example preparation workflow for software upgrade.

FIG. 4 illustrates an example of the service orchestration workflow for software upgrade. The workflow includes a pre check, downloading the software if the software image in not available in the PNF, activating the software and a post check before upgrade completion. If the activation step went as expected, the PNF runs the new version of the software, otherwise, it runs the old version. The software image may be available in the PNF if the preparation workflow illustrated in FIG. 5 is previously executed, in which the software image is downloaded prior to upgrade.

Figure 6:
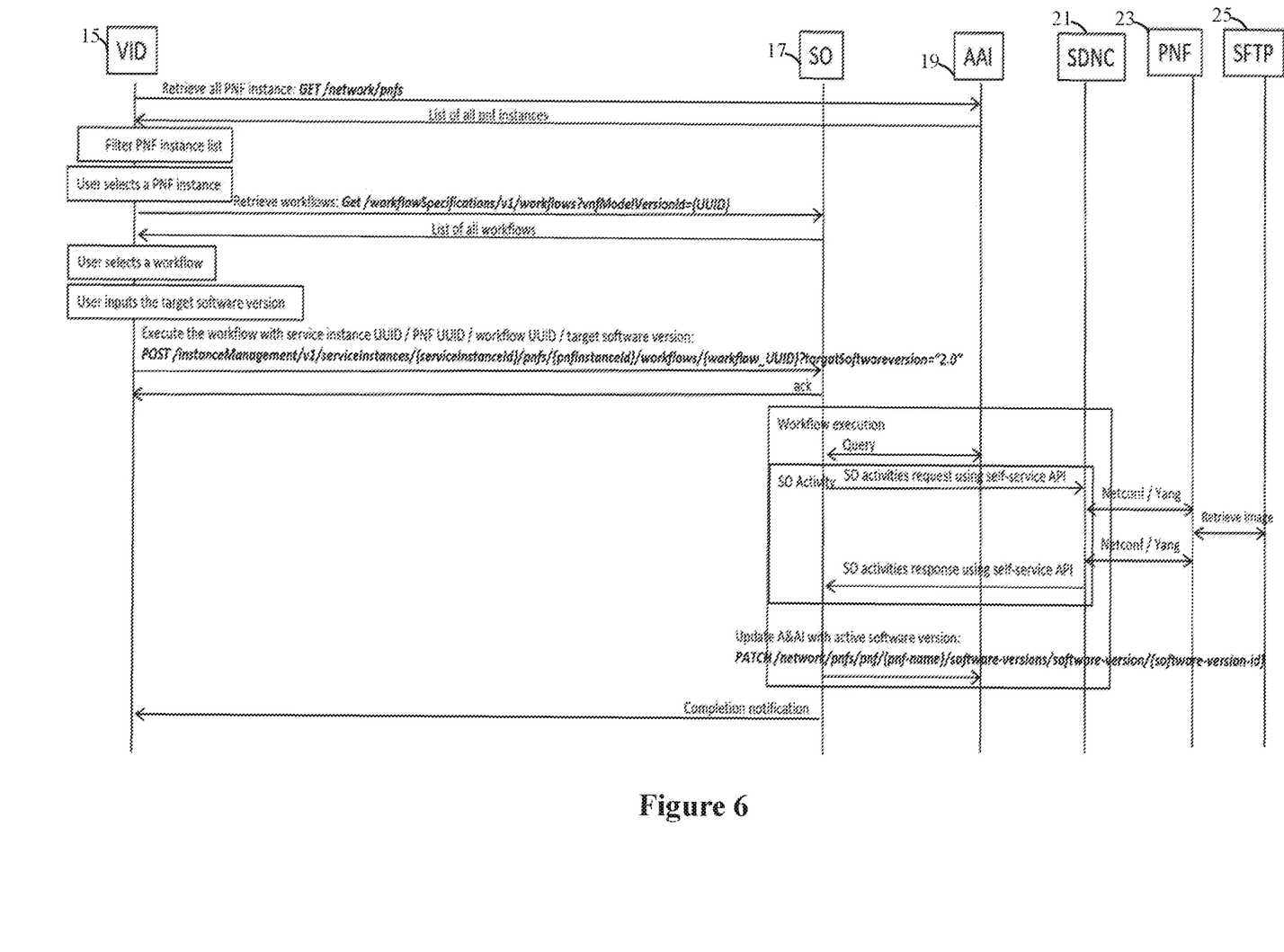
FIG. 6 is a schematic illustration of application programming interface (API) impacts.

FIG. 6 illustrates API impacts of a software upgrade procedure as well as interactions between the VID 15 and the SO 17. After the VID retrieves the list of PNF instances from the AAI 19, the user selects a PNF instance, and workflows associated with that PNF instance are retrieved from the service orchestration. The user can then select a workflow and a software version. This triggers the execution of the service level software upgrade workflow as described in FIG. 4 by the service orchestration.

Figure 7:
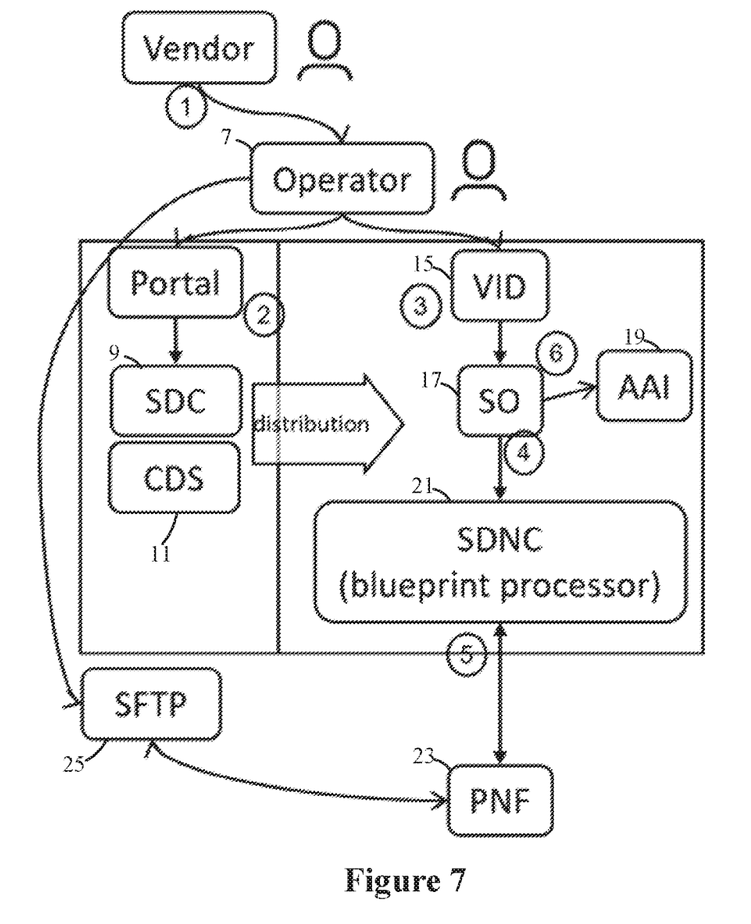
FIG. 7 is a schematic illustration of an upgrade procedure to support Use Case 1 and Use Case 2.

Reference is made to FIG. 7 which illustrates the next steps for supporting use case 1 and use case 2.

To support use cases 1 and 2, service level life cycle management (LCM) operations should be enabled, including: VNF/PNF software upgrade with updated service template; VNF/PNF schema update with updated service template; and service template update with multiple resource instances. This should include: updating the design time service template using vendor provided onboarding package; upgrading a run time service instance based on the updated service template; and updating the run time catalog at software upgrade completion.

Some issues to support use cases 1 and 2 include the following. SDC/modelling should: allow onboarding the requested software version using vendor provided onboarding package; supporting software version in internal model; and upgrading path info modelling. VID 15 user interface (UI) and APIs should allow service level operations. Service orchestration 17 should allow executing the workflow at service level. AAI 19 should: support updating resource model ID/version; and support updating service model identifier (ID)/version.

The following six steps process presents an example of the detailed procedure.

In step 1, an upgrade package, including the new software image, is provided by the vendor to the operator. In step 2, the operator onboards the upgrade package and creates or updates a resource at ONAP design time. During this step, the operator also adds an upgrade path info into the resource template. The upgrade path info includes: the allowed upgrade path, from which a resource can be upgraded from (previously) existing resources to the current resource, the expected upgrade procedure, upgrade scripts, etc.

In step 3, the operator updates an existing service template by replacing an existing resource with the new created or updated resources. In this step, the upgrade option is added into the service template. The upgrade option includes the information on how an old version service template can be upgraded into the current revision, and what are the expected service level operations, e.g. which resource is upgradable, how the traffic can be migrated during the upgrade, the resource upgrade sequence that indicates which corresponding resources must be upgraded first, at the same time or at a later step, etc. One should note that it is possible to have multiple upgrade options coexisting in one service template.

In step 4, the updated service template is distributed to the run time. In step 5, at run time, the operator selects an existing service instance to be upgraded, an upgrade option which is allowed by the service template, and a workflow to run. Then the upgrade procedure is initiated.

In step 6, when the upgrade procedure is executing, the service level operations are executed according to the selected upgrade option(s) defined in the service template. When upgrading each upgradable resource within the service instance, the workflow on resource level is executed according to the upgrade path info defined in the resource template.

Figure 8:
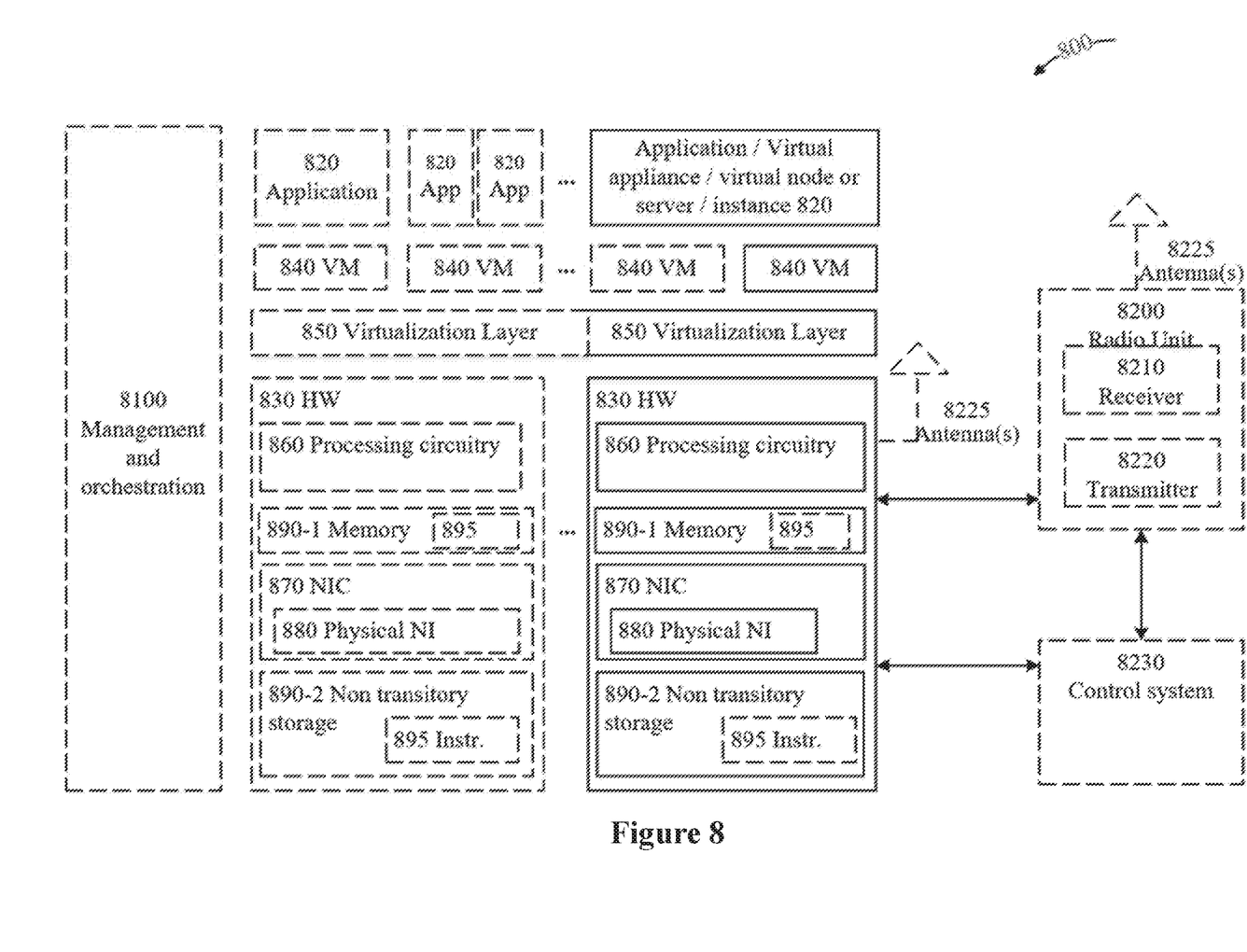
FIG. 8 is a schematic illustration of a system in which steps described herein may be executed.

FIG. 8 is a schematic block diagram illustrating a virtualization environment 800 in which some functions may be virtualized. Boxes illustrated with dashed lines may be optional. As used herein, virtualization can be applied to a node (e.g., a virtualized base station or a virtualized radio access node), network server, or to a device (e.g. any type of communication device) and relates to an implementation in which at least a portion of the functionality is implemented as one or more virtual components (e.g., via one or more applications, components, functions, virtual machines or containers executing on one or more physical processing nodes in one or more networks).

Some or all of the functions described herein may be implemented as virtual components executed by one or more virtual machines or containers implemented in one or more virtual environments 800 hosted by one or more of hardware nodes 830.

The functions may be implemented by one or more applications 820 (which may alternatively be called software instances, virtual appliances, network functions, virtual nodes, virtual network functions, etc.) operative to implement steps of the methods described herein. Applications 820 run in virtualization environment 800 which provides hardware 830 comprising processing circuitry 860 and memory 890. Memory 890 contains instructions 895 executable by processing circuitry 860 whereby application 820 is operative to provide any of the relevant features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by the processing circuitry 860. Each hardware devices may comprise one or more network interface controllers 870 (NICs), also known as network interface cards, which include physical network interface 880. Each hardware devices may also include non-transitory, persistent, machine readable storage media 890-2 having stored therein software 895 and/or instruction executable by processing circuitry 860. Software 895 may include any type of software including software for instantiating one or more virtualization layers 850 (also referred to as hypervisors), software to execute virtual machines 840 or containers as well as software allowing to execute functions described herein.

Virtual machines 840 or containers, comprise virtual processing, virtual memory, virtual networking or interface and virtual storage, and may be run by a corresponding virtualization layer 850 or hypervisor. Different instances of virtual appliance 820 may be implemented on one or more virtual machines 840 or containers, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840 or to a container.

As shown in FIG. 8, hardware 830 may be a standalone network node, with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

One or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

Some signaling can be effected with the use of control system 8230 which may alternatively be used for communication between the hardware nodes 830 and the radio units 8200.

Figure 9:
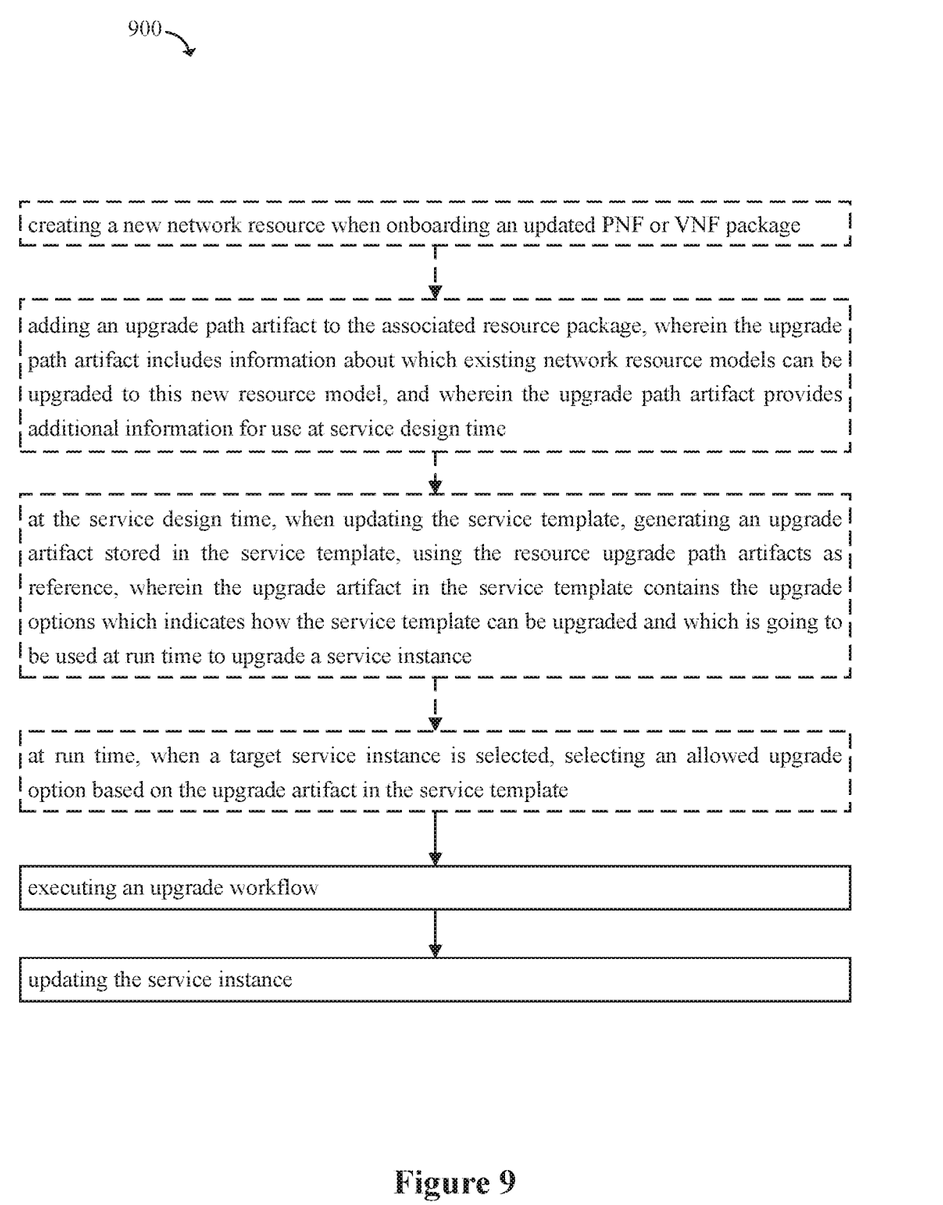
FIG. 9 is a flowchart of an example method.

In FIG. 9, functions or actions illustrated with dashed lines may be optional and may or may not be executed. FIG. 9 illustrates a method 900 for upgrading a service instance of a virtual network function (VNF) or physical network function (PNF) executing in the Open Network Automation Platform (ONAP), comprising: executing an upgrade workflow; and updating the service instance.

Prior to executing the upgrade workflow, there may be further steps. Creating a new network resource when onboarding an updated PNF or VNF package. Adding an upgrade path artifact to the associated resource package wherein the upgrade path artifact includes information about which existing network resource models can be upgraded to this new resource model. The upgrade path artifact provides additional information for use at service design time.

Still prior to executing the upgrade workflow, there may be further steps. At the service design time, when updating the service template, generating an upgrade artifact stored in the service template, using the resource upgrade path artifacts as reference. The upgrade artifact in the service template contains the upgrade options which indicates how the service template can be upgraded and which is going to be used at run time to upgrade a service instance.

Further steps may include, at run time, when a target service instance is selected, selecting an allowed upgrade option based on the upgrade artifact in the service template.

Figure 10:
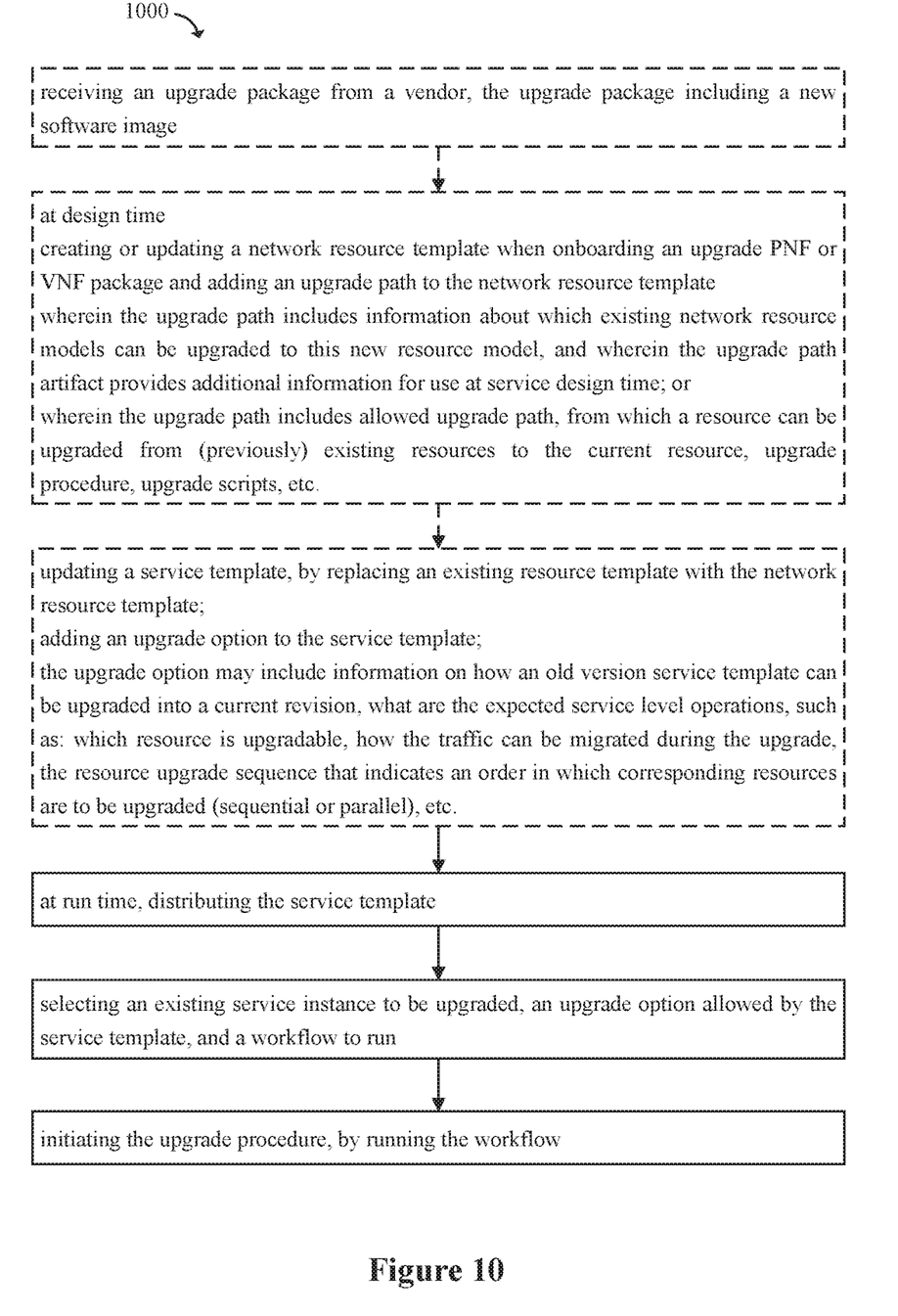
FIG. 10 is a flowchart of another example method.

In FIG. 10, functions or actions illustrated with dashed lines may be optional or may not be executed. FIG. 10 illustrates a method 1000 for upgrading a service instance of a virtual network function (VNF) or physical network function (PNF) executing in the Open Network Automation Platform (ONAP). The method comprises the steps of: at run time, distributing the service template; selecting an existing service instance to be upgraded, an upgrade option allowed by the service template, and a workflow to run; and initiating the upgrade procedure, by running the workflow.

Prior to executing the upgrade workflow, there may be further steps.

Receiving an upgrade package from a vendor, the upgrade package including a new software image.

At design time, creating or updating a network resource template when onboarding an upgrade PNF or VNF package and adding an upgrade path to the network resource template, wherein the upgrade path includes information about which existing network resource models can be upgraded to this new resource model, and wherein the upgrade path artifact provides additional information for use at service design time; or wherein the upgrade path includes allowed upgrade path, from which a resource can be upgraded from (previously) existing resources to the current resource, upgrade procedure, upgrade scripts, etc.

The method may comprise updating a service template, by replacing an existing resource template with the network resource template and adding an upgrade option to the service template. The upgrade option may include information on how an old version service template can be upgraded into a current revision, what are the expected service level operations, such as: which resource is upgradable, how the traffic can be migrated during the upgrade, the resource upgrade sequence that indicates an order in which corresponding resources are to be upgraded (sequential or parallel), etc.

Figure 11:
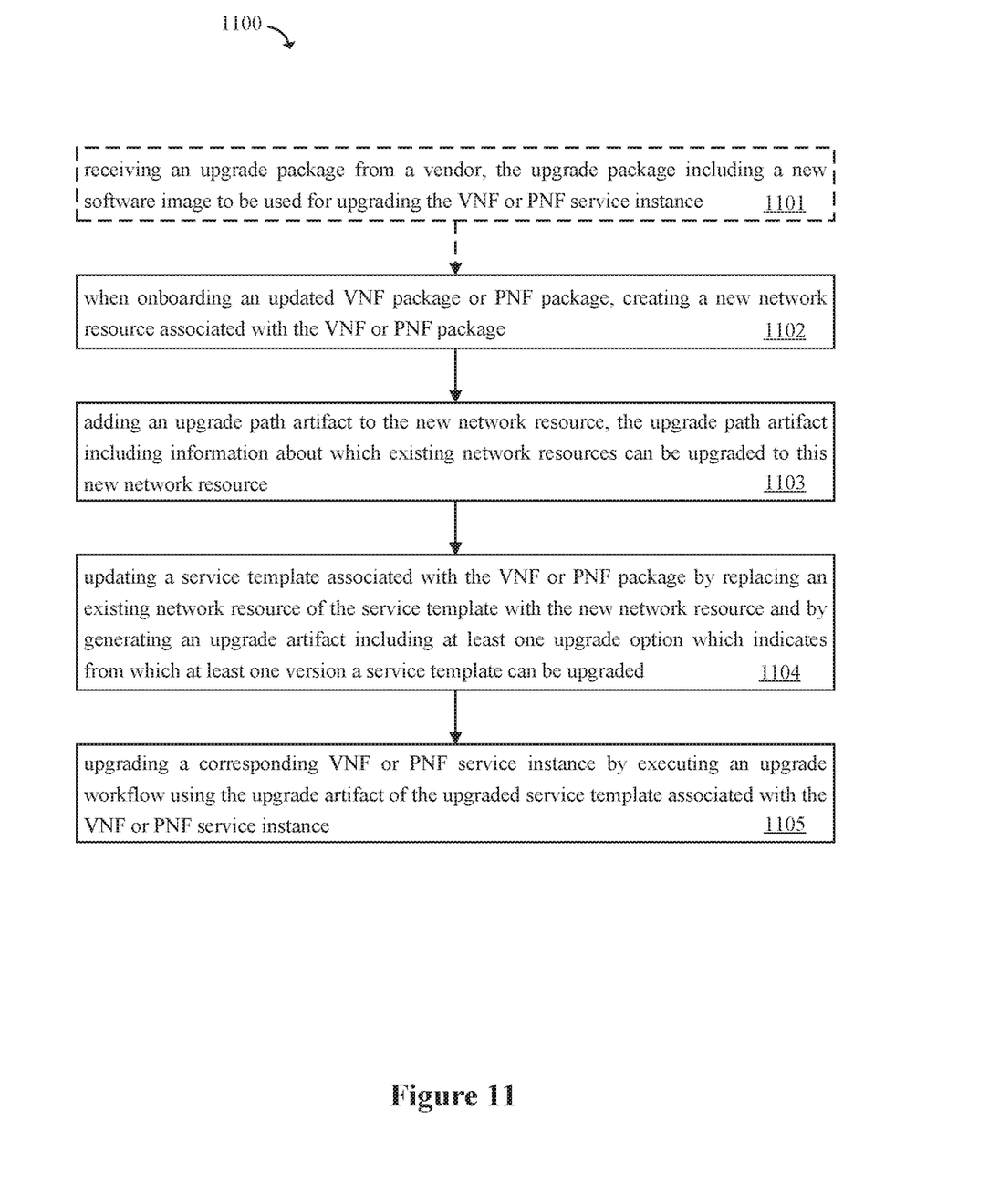
FIG. 11 is a flowchart of a method for upgrading a service instance of a virtual network function (VNF) or physical network function (PNF) executing in the Open Network Automation Platform (ONAP).

In FIG. 11, functions or actions illustrated with dashed lines may be optional and may or may not be executed. FIG. 11 illustrates a method 1100 for upgrading a service instance of a virtual network function (VNF) or physical network function (PNF) executing in the Open Network Automation Platform (ONAP). The method comprises when onboarding an updated VNF package or PNF package, creating, step 1102, a new network resource associated with the VNF or PNF package. The method comprises adding, step 1103, an upgrade path artifact to the new network resource, the upgrade path artifact including information about which existing network resources can be upgraded to this new network resource. The method comprises updating, step 1104, a service template associated with the VNF or PNF package by replacing an existing network resource of the service template with the new network resource and by generating an upgrade artifact including at least one upgrade option which indicates from which at least one version a service template can be upgraded. The method comprises upgrading, step 1105, a corresponding VNF or PNF service instance by executing an upgrade workflow using the upgrade artifact of the upgraded service template associated with the VNF or PNF service instance.

The method may further comprise receiving, step 1101, an upgrade package from a vendor, the upgrade package including a new software image to be used for upgrading the VNF or PNF service instance.

The upgrade path artifact may further include at least one of: an upgrade procedure and an upgrade script. The upgrade option may further include instructions for handling at least one service level operation. The at least one service level operation may include one of more of: which resource is upgradable, how traffic can be migrated during the upgrade, a resource upgrade sequence that indicates an order in which corresponding resources are to be upgraded. The order in which corresponding resources are to be upgraded may be characterized by being sequential or parallel.

There is provided a system, e.g. system 800, for upgrading a service instance of a virtual network function (VNF) or physical network function (PNF) executing in the Open Network Automation Platform (ONAP) comprising processing circuits and a memory. The memory contains instructions executable by the processing circuits whereby the system is operative to: when onboarding an updated VNF package or PNF package, create a new network resource associated with the VNF or PNF package. The system is operative to add an upgrade path artifact to the new network resource, the upgrade path artifact including information about which existing network resources can be upgraded to this new network resource. The system is operative to update a service template associated with the VNF or PNF package by replacing an existing network resource of the service template with the new network resource and by generating an upgrade artifact including at least one upgrade option which indicates from which at least one version a service template can be upgraded. The system is operative to upgrade a corresponding VNF or PNF service instance by executing an upgrade workflow using the upgrade artifact of the upgraded service template associated with the VNF or PNF service instance.

There is provided a non-transitory computer readable media, e.g. non transitory storage 890-2, having stored thereon instructions for upgrading a service instance of a virtual network function (VNF) or physical network function (PNF) executing in the Open Network Automation Platform (ONAP). The instructions comprise when onboarding an updated VNF package or PNF package, creating a new network resource associated with the VNF or PNF package. The instructions comprise adding an upgrade path artifact to the new network resource, the upgrade path artifact including information about which existing network resources can be upgraded to this new network resource. The instructions comprise updating a service template associated with the VNF or PNF package by replacing an existing network resource of the service template with the new network resource and by generating an upgrade artifact including at least one upgrade option which indicates from which at least one version a service template can be upgraded. The instructions comprise upgrading a corresponding VNF or PNF service instance by executing an upgrade workflow using the upgrade artifact of the upgraded service template associated with the VNF or PNF service instance.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

The invention claimed is:

1. A method for upgrading a service instance of a virtual network function (VNF) or physical network function (PNF) executing in the Open Network Automation Platform (ONAP), comprising:
   when onboarding an updated VNF package or PNF package, creating a new network resource associated with the VNF or PNF package;
   adding an upgrade path artifact to the new network resource, the upgrade path artifact including information about which existing network resources can be upgraded to the new network resource;
   updating a service template associated with the VNF or PNF package by replacing an existing network resource of the service template with the new network resource and by generating an upgrade artifact including at least one upgrade option which indicates from which at least one version a service template can be upgraded; and
   upgrading a corresponding VNF or PNF service instance by executing an upgrade workflow using the upgrade artifact of the upgraded service template associated with the VNF or PNF service instance.

2. The method of claim 1, further comprising receiving an upgrade package from a vendor, the upgrade package including a new software image to be used for upgrading the VNF or PNF service instance.

3. The method of claim 1, wherein the upgrade path artifact further includes at least one of: an upgrade procedure and an upgrade script.

4. The method of claim 1, wherein the upgrade option further includes instructions for handling at least one service level operation.

5. The method of claim 4, wherein the at least one service level operation includes one of more of: which resource is upgradable, how traffic can be migrated during the upgrade, a resource upgrade sequence that indicates an order in which corresponding resources are to be upgraded.

6. The method of claim 5, wherein the order in which corresponding resources are to be upgraded is characterized by being sequential or parallel.

7. A system for upgrading a service instance of a virtual network function (VNF) or physical network function (PNF) executing in the Open Network Automation Platform (ONAP) comprising processing circuits and a memory, the memory containing instructions executable by the processing circuits whereby the system is operative to:
   when onboarding an updated VNF package or PNF package, create a new network resource associated with the VNF or PNF package;
   add an upgrade path artifact to the new network resource, the upgrade path artifact including information about which existing network resources can be upgraded to the new network resource;
   update a service template associated with the VNF or PNF package by replacing an existing network resource of the service template with the new network resource and by generating an upgrade artifact including at least one upgrade option which indicates from which at least one version a service template can be upgraded; and
   upgrade a corresponding VNF or PNF service instance by executing an upgrade workflow using the upgrade artifact of the upgraded service template associated with the VNF or PNF service instance.

8. A non-transitory computer readable media having stored thereon instructions for upgrading a service instance of a virtual network function (VNF) or physical network function (PNF) executing in the Open Network Automation Platform (ONAP), the instructions comprising:
   when onboarding an updated VNF package or PNF package, creating a new network resource associated with the VNF or PNF package;
   adding an upgrade path artifact to the new network resource, the upgrade path artifact including information about which existing network resources can be upgraded to the new network resource;
   updating a service template associated with the VNF or PNF package by replacing an existing network resource of the service template with the new network resource and by generating an upgrade artifact including at least one upgrade option which indicates from which at least one version a service template can be upgraded; and
   upgrading a corresponding VNF or PNF service instance by executing an upgrade workflow using the upgrade artifact of the upgraded service template associated with the VNF or PNF service instance.

* * * * *